United States Patent [19]

Siebeck et al.

[11] 4,244,773
[45] Jan. 13, 1981

[54] APPARATUS FOR APPLYING WELDABLE BANDS TO PACKAGES OR THE LIKE

[76] Inventors: Gunter Siebeck, Panoramaweg 3; Peter P. Lüdtke, Hohenstauferstr. 1, both of 6930 Eberbach, Fed. Rep. of Germany

[21] Appl. No.: 16,529
[22] Filed: Mar. 1, 1979

[30] Foreign Application Priority Data

Mar. 3, 1978 [LU] Luxembourg .............. 79160

[51] Int. Cl.³ .............. B32B 31/00; B35B 13/34; B35B 13/00; B35B 13/04
[52] U.S. Cl. .............. 156/522; 53/589; 100/33 PB; 100/6; 100/26; 156/580.1
[58] Field of Search .............. 156/522, 580.1, 391; 53/589; 100/25, 26, 33 PB, 10, 6, 29

[56] References Cited

U.S. PATENT DOCUMENTS

| | | | |
|---|---|---|---|
| 3,489,076 | 1/1970 | Countryman | 53/589 |
| 3,946,659 | 3/1976 | Gutjahr et al. | 100/26 |
| 3,950,203 | 4/1976 | Van der Wal | 156/522 |
| 4,154,158 | 5/1979 | Leslie et al. | 100/26 |

*Primary Examiner*—John T. Goolkasian
*Assistant Examiner*—Louis Falasco
*Attorney, Agent, or Firm*—Peter K. Kontler

[57] ABSTRACT

Apparatus for applying a weldable web or band of synthetic plastic material to a package on a table has a feeding device which advances the web from a source into the channel of a mobile loop forming device loosely surrounding the package. The feeding device is arrested when the web is looped around the package so that the end portions of the resulting loop overlap. The loop forming device is then removed and the web is moved rearwardly so that the loop snugly surrounds the package. In the next step, the web is severed between the outer overlapping portion of the loop and the source, and the severing device is withdrawn so that the sonotrode of an ultrasonic welding unit can bond the outer portion of the loop to the adjacent inner portion all the way to the cut where the outer portion was severed from the source.

17 Claims, 13 Drawing Figures

APPARATUS FOR APPLYING WELDABLE BANDS TO PACKAGES OR THE LIKE

BACKGROUND OF THE INVENTION

The present invention relates to improvements in apparatus for applying looped webs or bands around various objects, especially around parcels, packages and similar block-shaped commodities. More particularly, the invention relates to improvements in apparatus of the type wherein a band or web of weldable synthetic plastic or other suitable material is applied (looped) around an object, wherein the resulting loop is separated from the remainder of the web in such a way that the two end portions of the loop overlie each other, and wherein the overlapping end portions of the loop are thereupon connected to each other to form a joint.

It is already known to form a closed loop around a block-shaped package or an analogous object in such a way that neither of the two overlapping end portions of the joint extends from the looped web, i.e., that the outer overlapping portion is fully bonded to the adjacent inner portion of the looped web. This is desirable because the projecting part of a web is likely to be caught during transport or during other manipulation of the object and to cause damage to or complete destruction of the joint.

In presently known apparatus for applying loops of web-like material around parcels or the like, the joint is formed by welding the normally thermoplastic synthetic plastic material of the web. Thus, the overlapping end portions of the loop are heated to a temperature at which the material of such portions melts, and the resulting welded joint is allowed or caused to set in order to prevent opening of the loop. The knife which severs the loop from the remainder of the web (e.g., from a roll of convoluted web) is mounted on a first welding electrode which is movable toward and away from a stationary counterelectrode. The overlapping portions of the loop are disposed in the space between the two electrodes. The severing takes place simultaneously with bonding or immediately prior to heating of overlapping portions of the loop. In many instances, the knife is closely adjacent to the mobile electrode so that it can sever the loop in immediate proximity to the welded joint.

The just described prior art apparatus are satisfactory to the extent that they insure the absence of projecting portions in the region where the end portions of the loop overlie and are bonded to each other. However, thermal welding takes up a considerable amount of time, not only because the overlapping portions of the web must be heated at least close to the melting point but also because the joint must be allowed to set in order to avoid its destruction immediately after the completion of the thermal welding operation. Thus, the object to be provided with a looped web must remain in the apparatus until the material of the joint sets.

It is also known to weld synthetic plastic material by resorting to an ultrasonic welding unit. Such mode of welding requires less time than thermal welding because the joint is sufficiently strong immediately upon completion of the welding operation and the making of the joint also requires less time than the making of joints by resorting to thermal welding. Ultrasonic welding apparatus employ so-called sonotrodes which must be operated in the resonance range in order to guarantee an economical ultrasonic welding operation. The resonance of the sonotrode can be adversely affected by the knife if the latter contacts the sonotrode during the making of an ultrasonically formed welded joint.

OBJECTS AND SUMMARY OF THE INVENTION

An object of the invention is to provide a novel and improved apparatus for bonding the overlapping end portions of a looped web which surrounds a parcel, a package or another commodity.

Another object of the invention is to provide an apparatus wherein the bonding operation is carried out by resorting to an ultrasonic welding unit and wherein the sonotrode of such unit is not influenced by the means for severing the loop from the remaining portion of the web.

A further object of the invention is to provide an apparatus of the above-outlined character wherein the joint does not exhibit projecting web portions even though the severing means does not share the movements of any mobile part or parts of the ultrasonic welding unit.

An additional object of the invention is to provide the apparatus with novel and improved loop forming, loop tightening and loop severing means.

An ancillary object of the invention is to provide the apparatus with novel and improved means for exposing a freshly formed loop prior to tightening of such loop into actual contact with the package.

Another object of the invention is to provide the apparatus with novel and improved means for holding the loop against movement in the course of the bonding operation.

The invention is embodied in an apparatus for applying webs around packages or other objects, e.g., for applying webs or bands around block-shaped parcels. The apparatus comprises a support, a table or other suitable means for positioning an object on the support, a roll or another source of web, a device for looping the web around the object on the table so that the looped portion of the web includes overlapping inner and outer portions with the outer portion connected to the source, means for bonding the overlapping portions to each other including a bonding element (e.g., the sonotrode of an ultrasonic welding unit) movable toward and away from the outer portion along a first path, means for severing the outer portion from the source, and mobile holder means for moving the severing means along a second path to a first position in which the severing means is located in the first path and severs the outer portion from the source in a predetermined cutting plane which is disposed within the first path, and to a second position in which the severing means is retracted from the first path so that the bonding element can move toward the outer portion to connect the latter with the inner portion all the way to the aforementioned cutting plane, i.e., in such a way that the outer portion does not exhibit a free end which is not bonded to the inner portion of the looped web portion.

If the bonding element is or includes a sonotrode, the bonding means further comprises means for generating ultrasonic waves which are applied to the sonotrode.

The holder means for the severing means is preferably pivotable between first and second positions and the apparatus preferably further comprises an abutment (e.g., a plate-like counterelectrode which is fixedly or movably mounted on the support) which is adjacent to the inner portion of the looped portion of the web. The severing means and/or the holder means for the severing means preferably comprises a jaw or an analogous component which serves to engage the looped web portion and to bias the thus engaged part of the looped web portion against the abutment in a region which is adjacent to the cutting plane but is located outside of the first path in one (preferably second) position of the severing means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
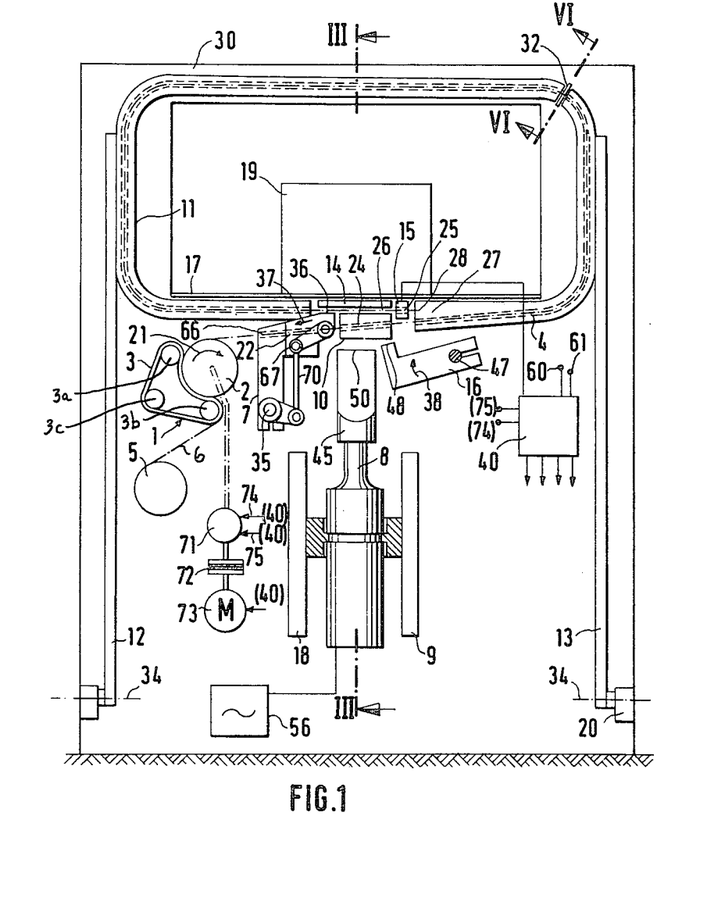
FIG. 1 is a front elevational view of an apparatus which embodies one form of the invention, the object or commodity to be provided with a looped band or web being shown within the confines of the loop forming device which is illustrated in the operative position and certain parts of the apparatus being shown diagrammatically and/or in partial section.

FIG. 1 shows an apparatus which comprises a frame or support 20 for an object 19 (e.g., a parcel or another package) to be tied by a weldable web or band 6 and for such component parts which apply a loop of web material around the object 19, which sever the looped portion of the web from the remainder of the web, and which provide the looped web portion with a welded joint in such a way that neither end portion of the loop projects beyond the joint. The support 20 includes a spindle or another suitable carrier for a roll or bobbin 5 constituting a source of supply of web material 6, and the support carries a web feeding unit 1 which draws the web 6 from the roll 5 and includes a roller 2 driven in the direction of arrow 21 and an endless belt 3 trained over rollers 3a, 3b and 3c. The web 6 is caused to pass between that portion of the belt 3 which extends from the roller 3a to the roller 3b on the one hand, and the adjacent portion of the peripheral surface of the roller 2 on the other hand.

The support 20 further carries a knife holder 7 which is located downstream of the feeding unit 1, as considered in the direction of lengthwise movement of the web 6, and a welding or bonding unit 8 which is reciprocable along a path defined by two guide rails 9, 18 and is movable toward and away from a welding station 41 located downstream of the knife holder 7. Still further, the support 20 carries a guide member 10 which defines a path for the web 6 in the region of the welding station 41, and a loop forming device 11 which converts the leader of the web 6 into a loop 29 (FIG. 2) loosely surrounding the object 19. The loop forming device 11 is connected with or includes two parallel arms 12, 13 which are pivotally secured to the support 20, as at 34, so that the device 11 can be pivoted toward and away from the observer of FIG. 1. The pivot member 34 is remote from the loop forming device 11.

The support 20 also carries a normally stationary plate-like abutment or counterelectrode 14 which is disposed at the welding station 41 and is in register with the reciprocable bonding element or sonotrode 45 of the welding unit 8. A web detecting proximity switch 15 is mounted adjacent to the welding station 41 and to a jaw 48 of a pivotable clamping device 16 serving to temporarily engage the looped leader 29 of the web 6. The object 19 is supported by a positioning device here shown as a platform or table 17 which is also mounted in the support 20, together with a control unit 40 which regulates the movements of some or all mobile component parts of the apparatus.

The web 6 consists of synthetic plastic material which can be welded by an ultrasonic welding or bonding unit. The feeding unit 1 delivers successive increments of the web 6 into a slit-shaped channel 66 of the knife holder 7 and thence into the channel 22 of a severing unit 67 which is mounted on the holder 7. The means for driving the roller 2 of the feeding unit 1 comprises a reversible prime mover 73 (e.g., an electric motor) which transmits torque to the shaft of the roller 2 by way of a slip clutch 72. The roller 2 rotates together with a disk 71 which receives torque from the driven element of the slip clutch 72. The operative connection between the driven element of the slip clutch 72 and the shaft of the roller 2 is indicated in FIG. 1 by phantom lines. The motor 73 receives start and stop signals, as well as signals which determine the direction of rotation of the driving element of the slip clutch 72, from the corresponding outputs of the control unit 40.

Figure 13:
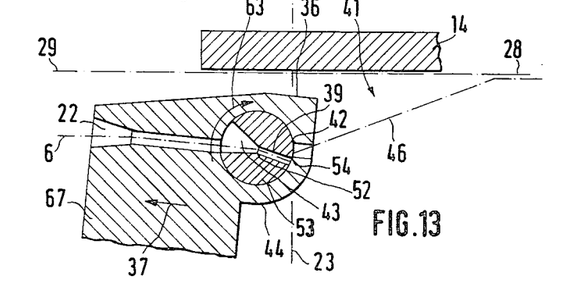
FIG. 13 illustrates the structure of FIG. 12 but with the knife in a position it assumes immediately after severing of the web.

At the start of a loop forming, web severing and welding operation, a foremost end 28 of the web 6 is located in a cutting plane 23 which is indicated in FIG. 13 by a phantom line. This plane lies in the path of movement of the sonotrode 45 to its extended position. The motor 73 is on to drive the roller 2 in the direction of arrow 21 so that the foremost end 28 of the web 6 advances beyond the cutting plane 23 and enters a slit-shaped channel 24 of the guide member 10 and thereupon an arcuate slit-shaped guide channel 4 of the loop forming device 11. As the motor 73 continues to drive the roller 2, the foremost end 28 of the web 6 advances beyond the channel 4 and enters a space 26 between the abutment or counterelectrode 14 and the severing unit 67 on the knife holder 7. The space 26 extends beyond the unit 67 and along the upper side of the guide member 10, as viewed in FIG. 1. From there on, the foremost end 28 of the web 6 enters a slit-shaped guide channel 25 of the proximity detector switch 15 and comes to a halt in a position slightly beyond the channel 25. Stoppage of the motor 73 is effected by the switch 15 which detects the foremost end 28 and transmits an appropriate signal to the control unit 40 which, in turn, transmits a stop signal to the circuit of the motor 73. The foremost end 28 advances slightly beyond the switch 15 due to inertia of the motor 73 and enters a recess or notch 27 of the loop forming device 11. The switch 15 comprises a conventional photocell whose optoelectronic transducer transmits the aforementioned signal to the control unit 40 when the foremost end 28 interrupts the light beam between the light source and the transducer of the photocell. The switch 15 insures that the material of the web 6 is not wasted, i.e., that the length of overlapping inner and outer end portions of a loop is not excessive.

The aforementioned channels 24, 4, space 26, channel 25 and recess 27 are aligned with each other so that the foremost end 28 can readily advance along the channels 24, 4, 25 and in the space 26 to enter the recess 27 while the motor 73 drives the roller 2 in the direction of arrow 21. The web 6 exhibits a certain amount of rigidity so that the end 28 can readily advance from the outlet of the channel 24 into the inlet of the channel 4 and so forth to ultimately enter the recess 27.

All of the aforementioned channels, with the exception of the channel 22, are open at one side, namely, at that side which faces away from the observer of FIG. 1. This renders it possible to move the loop forming device 11, the guide member 10 and the switch 15 in and counter to the directions respectively indicated by arrows 57 (device 11 and switch 15) and 59 (guide member 10) shown in FIG. 2. Consequently, when a loop 29 is formed in the aforedescribed manner, the parts 11, 10, 15 are moved forwardly as viewed in FIG. 1 or 2 (i.e., toward the observer of these Figures) to thereby expose the loop 29 while the latter loosely surrounds the object 19 on the table 17. When in the operative position of FIGS. 1, 2 and 3, the loop forming device 11 abuts against a plate-like stop 30 of the frame or support 20. The stop 30 then overlies an open side 31 of the quide channel 4. The looped leader 29 of the web 6 is held against movement with the device 11 from the operative position of FIGS. 1 to 3 by a retaining yoke 32 which overlies the front marginal portion of the looped leader 29 (as viewed in FIG. 1) and is secured to the support 20. The retaining yoke 32 is normally received in a transverse slot 33 of the two-piece loop forming device 11.

Figure 2:
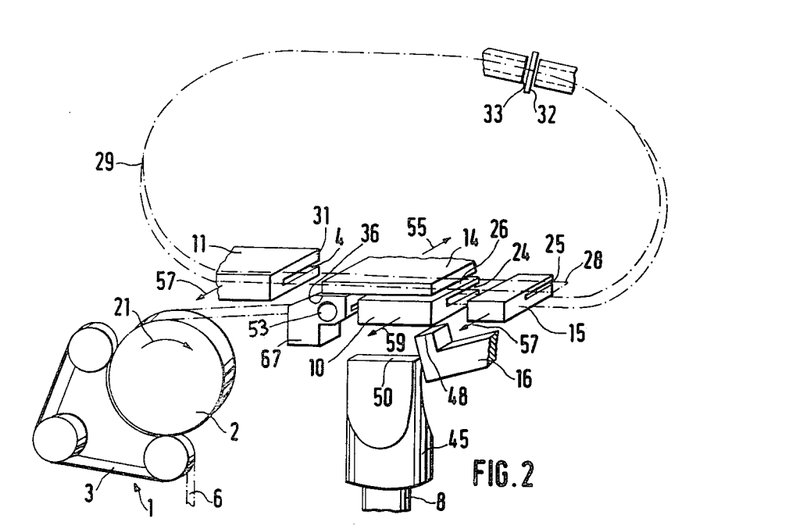
FIG. 2 is an enlarged perspective view of certain parts of the apparatus of FIG. 1, with the major portion of the loop forming device broken away to show the looped leader of the web, and with a clamping jaw and the welding unit shown in retracted positions.
Figure 3:
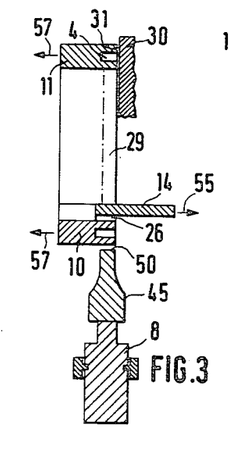
FIG. 3 is a fragmentary sectional view as seen in the direction of arrows from the line III—III of FIG. 1, the loop forming device and the abutment being shown in operative positions and the welding unit being remote from the welding station.
Figure 7:
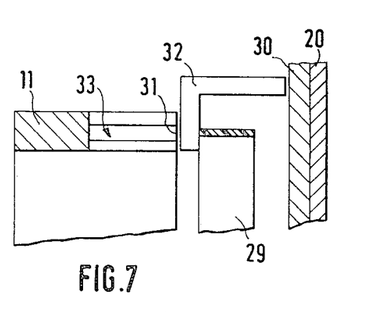
FIG. 7 illustrates the structure of FIG. 6 but with the loop forming device shown in inoperative position.
Figure 8:
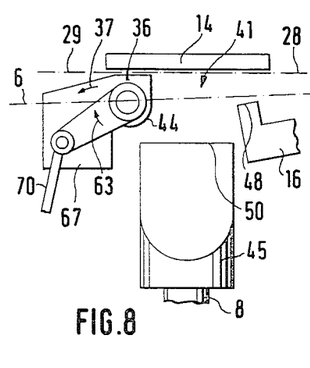
FIG. 8 is an enlarged front elevational view of the welding station in the apparatus of FIG. 1, one of the two clamping jaws being shown in operative position and the sonotrode of the welding unit being shown in retracted position.

The parts 11, 10 and 15 are moved in the direction of arrows 57, 59 shown in FIG. 2 as soon as the loop 29 is completed. The loop 29 retains its shape and position, partly owing to rigidity of the material of the web 6 and partly due to the provision of the retaining yoke 32. As shown in FIG. 7, the yoke 32 does not interfere with a reduction of the size of the loop 29, i.e., the latter can be pulled tight around the object 19 once the parts 11, 10 and 15 are moved out of the way.

Figure 4:
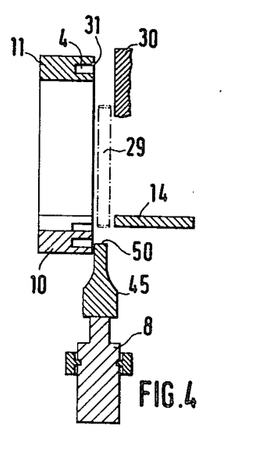
FIG. 4 illustrates the structure of FIG. 3 but with the loop forming device shown in inoperative position.
Figure 5:
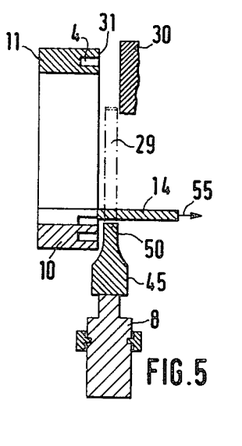
FIG. 5 illustrates the structure of FIG. 4 but with the sonotrode of the welding unit shown at the welding station.
Figure 6:
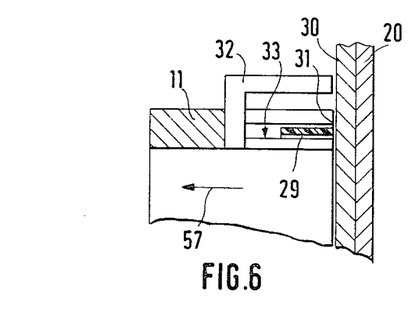
FIG. 6 is an enlarged sectional view as seen in the direction of arrows from the line VI—VI of FIG. 1.

Since the pivot member 34 is distant from the loop 29, the channels 4, 24 and 25 can be rather narrow, i.e., when shifted to their inoperative positions to expose the loop 29, the parts 11, 10 and 15 move substantially at right angles to the front side of the plate-like stop 30. The device 11 preferably constitutes a support for the guide member 10 and switch 15, i.e., these parts move in unison between the operative positions of FIGS. 1 to 3 and the inoperative positions (see the position of the device 11 in FIGS. 4, 5 and 7). The means for securing the guide member 10 and the switch 15 to the loop forming device 11 is not specifically shown in the drawing. A stop (not shown) is provided to arrest the device 11 in the inoperative position of FIGS. 4, 5 and 7.

The knife holder 7 is pivotable on a shaft 35 whose axis is normal to the plane of the loop 29 and is secured to the support 20. An upper portion 36 of the severing unit 67 (as viewed in FIGS. 1, 2, 12 and 13) constitutes a clamping jaw which is adjacent to one side of the aforementioned space 26 opposite the counterelectrode 14 when the holder 7 is maintained in the retracted (second) position of FIG. 1. Once the loop 29 is exposed, the holder 7 is pivoted in a counterclockwise direction, as viewed in FIG. 1 (see the arrow 37), so that the jaw 36 clamps the adjacent portion of the loop 29 against the counterelectrode 14. The motor 73 is then started to rotate the roller 2 counter to the direction indicated by arrow 21 so that the web 6 is moved back toward the roll 5 and the size of the loop 29 decreases. Such movement of the web 6 is terminated when the loop 29 comes into contact with and snugly surrounds the object 19. The control unit 40 can receive a signal to start the motor 73 in reverse in response to completion of pivotal movement of the knife holder 7 in the direction of arrow 37, i.e., as soon as the jaw 36 presses the adjacent portion of the loop 29 against the counterelectrode 14. The roller 2 comes to a halt as soon as the loop 29 snugly surrounds the object 19 because the driving element of the clutch 72 then simply rotates with respect to the driven element and roller 2. The extent of tensioning of the material which forms the loop 29 (while the latter snugly surrounds the object 19) can be selected in advance by appropriate adjustment of the slip clutch 72. A detector 74 which is adjacent to the disk 71 transmits a signal when the disk 71 (and hence the roller 2) is arrested by the tensioned loop 29, and such signal is transmitted to the control unit 40 to initiate stoppage of the motor 73.

Figure 9:
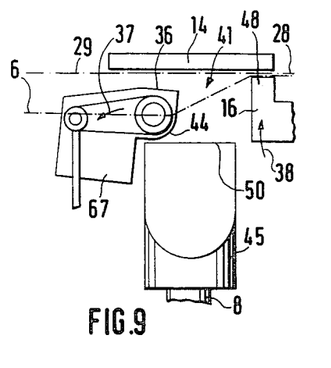
FIG. 9 illustrates the structure of FIG. 8, with one of the clamping jaws retracted and the other clamping jaw shown in operative position.

The clamping device 16 dwells in the retracted position of FIG. 1 while the apparatus forms the loop 29, while the apparatus exposes the loop 29, and while the loop 29 is caused to tightly surround the object 19. The device 16 is thereupon pivoted in the direction of arrow 38 so that its jaw 48 engages the loop 29. The means for pivotally supporting the device 16 comprises a shaft 47 which is parallel to the shaft 35 and is mounted on the support 20. The jaw 48 urges the adjacent overlapping inner and outer portions of the shortened loop 29 against each other and against the counterelectrode 14 (see FIG. 9). The means (e.g., an electromagnet which receives signals from the control unit 40) for pivoting the clamping device 16 in the direction of arrow 38 is thereupon arrested while the jaw 48 biases the overlapping inner and outer portions of the loop 29 against the counterelectrode 14, and the knife holder 7 is thereupon pivoted counter to the direction of arrow 37 to assume the (first) position which is shown in FIG. 9. Such pivoting of the holder 7 results in severing of the web 6 by the unit 67. The web 6 is severed in the cutting plane 23 and extends between the retracted sonotrode 45 and the counterelectrode 14, i.e., in the path of movement of the sonotrode 45 to its extended position.

Figure 12:
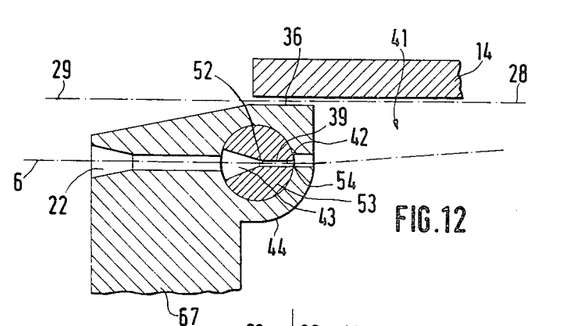
FIG. 12 is an enlarged sectional view of the severing unit and of a portion of the abutment for the sonotrode of the welding unit, the knife of the severing unit being shown in idle position.

As shown in FIGS. 12 and 13, the severing unit 67 comprises a casing 44 for a rotary cylindrical knife or severing tool 53 whose axis 52 is parallel to the axis of the shaft 35. The tool 53 has a substantially diametral channel 39 with a funnel-shaped enlarged inlet 43 which communicates with the channel 22 of the holder 7 (acutally of the casing 44 of the severing unit 67) in all angular positions of the tool 53. Prior to severing, the web 6 extends through and beyond the channel 39. The means for rotating the tool 53 with respect to the casing 44 (i.e., the counterknife) of the severing unit 67 comprises a linkage 70 (see FIG. 1). FIG. 12 shows the tool 53 in the idle position. The linkage 70 is actuatable to move the tool 53 from such idle position to a second position (see the arrow 63) which is shown in FIG. 13 and back to the position of FIG. 12 whereby the cutting edge 42 at the discharge end of the channel 39 severs the web 6. The outer web portion 46 immediately in front of the cut is located at the welding station 41; such portion of the web 6 forms part of the tightened loop 29 which is now fully separated from the major portion of the web, i.e., from the roll 5. The cutting edge 42 is located at the upper side of the discharge end of the channel 39, as viewed in FIG. 12 or 13. The cutting edge of the counterknife or casing 44 of the severing unit 67 is shown at 54. The provision of funnel-shaped inlet 43 is desirable in order to avoid damage to or severing of the web 6 at the discharge end of the channel 22 while the tool 53 turns to and back from the second position shown in FIG. 13. The cutting plane 23 is substantially tangential to the cylindrical tool 53 and includes the cutting edge 54 of the counterknife 44; this cutting edge is defined by a sleeve-like portion of the casing 44 for the tool 53. The angular movement of the tool 53 between the positions in FIGS. 12 and 13 is relatively small. The same applies for pivotal movement of the knife holder 7 along an arcuate path between the positions of FIGS. 1 and 9. The path of movement of the severing unit 67 in response to pivoting of the holder 7 is adjacent to and extends slightly into the path of reciprocatory movement of the sonotrode 45. This insures that the outer web portion 46 between the cutting plane 23 and the jaw 48 is relatively short. Small angular displacements of the holder 7 and tool 53 are desirable because this reduces the length of intervals which are necessary to complete successive loop forming, loop shortening, web severing and joint forming operations.

Figure 10:
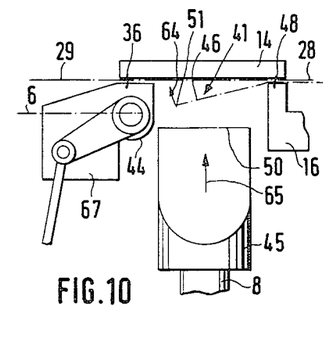
FIG. 10 illustrates the structure of FIG. 8, with both clamping jaws shown in operative positions.
Figure 11:
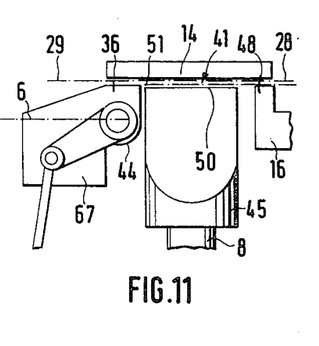
FIG. 11 illustrates the structure of FIG. 10, with the sonotrode of the welding unit in extended position.

When the severing operation is completed, the knife holder 7 is pivoted back to the position of FIG. 10 so that the jaw 36 engages and clamps the adjacent portion of the shortened loop 29 against the counterelectrode 14 in order to prevent lengthwise movements of the loop at the welding station 41 while the overlapping portions of the loop are bonded to each other under the action of the sonotrode 45. The sonotrode 45 is thereupon moved in the direction of arrow 65 from the position of FIG. 10 to the position of FIG. 11 whereby the welding unit 8 moves along the path which is defined by the guide rails 9 and 18. A front end face 50 of the sonotrode 45 enters the welding station 41 and acts upon the overlapping inner and outer end portions of the loop 29. A outer end portion 46 of the loop 29 is pushed (actually pivoted) in the direction of arrow 64 (FIG. 10) while the sonotrode 45 moves from the retracted position to the position of FIG. 11. A trailing edge 51 of the web portion 46 is located in front of the front end face 50 (see FIG. 11) so that the outer end portion 46 is welded to the adjacent portion of the loop 29 all the way to the cutting plane 23. This insures that the joint which is formed by the unit 8 does not exhibit a projecting portion of the web 6; such projecting portion could be caught during manipulation of the object 19. The welding unit 8 further comprises a means 56 for generating ultrasonic waves which causes the sonotrode 45 to perform ultrasonic vibratory movements. The resulting energy is transmitted to the overlapping end portions of the loop 29 to initiate the making of a welded joint.

When the welding operation is completed, the welding unit 8, the knife holder 7 and the clamping device 16 are returned to the positions of FIG. 1, and the counterclockwise 14 is removed in the direction of arrow 55 (see FIG. 2) so that the object 19 (with the loop 29 applied therearound) lies freely on the table 17 and can be readily removed, either by hand or by resorting to a suitable automatic or semiautomatic removing or transferring mechanism, not shown. The parts 11, 10 and 15 are thereupon returned to the operative positions of FIG. 1, and a fresh object 19 is placed onto the table 17 within the confines of the loop forming device 11. The apparatus is then ready to form a loop around the freshly inserted object 19, to tighten the loop, to separate the loop from the major part of the web, and to weld the overlapping end portions of the loop to each other.

The apparatus further comprises suitable guide means for all mobile parts which require guidance, and suitable device means for imparting to such mobile parts movements in a predetermined sequence as described above. As also mentioned above, the drive means may comprise electromagnets (reciprocatory and/or rotary); other suitable drive means include transmissions, gear trains, linkages and/or others. Also, such drive means may include one or more reversible motors (e.g., electric, pneumatic or hydraulic motors) which can reciprocate, pivot, turn and/or otherwise move the various mobile parts in response to signals which are transmitted by the control unit 40 or an analogous movement regulating device. FIG. 1 further shows two inputs 60 and 61 of the control unit 40; these inputs receive signals from suitable optical, mechanical, pneumatic and/or otherwise constructed detectors which monitor the positions and/or movements of various mobile parts and/or the condition of the loop 29 to transmit appropriate signals which initiate stoppage or movements and/or influence the nature of movements (forward, reverse, slow, rapid, etc.) of various mobile parts. The exact nature of means for synchronizing the movements of various mobile parts so that a loop forming, tightening, severing and welding operation can be completed within short intervals of time forms no part of the present invention.

The improved apparatus is susceptible of many modifications without departing from the spirit of the invention. For example, the switch 15 can be replaced with a device 75 (shown in FIG. 1) which monitors the extent of angular displacement of the disk 71 and automatically arrests the motor 73 (against further rotation of the roller 2 in the direction of arrow 21) when the length of the web portion 6 which is paid out by the roll 5 suffices to insure the formation of a satisfactory loop 29, e.g., to insure that the foremost end 28 of the loop 29 extends into the recess 27 of the loop forming device 11. The monitoring device 75 can be used with particular advantage when the apparatus is set up to apply webs around a long series of identical objects 19.

The provision of a reversible motor 73 contributes to versatility of the improved apparatus. Thus, the device 11 can form loops 29 whose size exceeds the dimensions of an object 19, and the reversible motor 73 thereupon insures that the size of the loop 29 is reduced so as to match the dimensions of the object 19. As mentioned above, the slip clutch 72 enables the motor 73 to rotate in reverse after the roller 2 comes to a halt, i.e., when the size of the loop 29 is being reduced sufficiently to insure that the loop 29 snugly surrounds the adjacent sides of the object 19. The detector 74 insures that the motor 73 is arrested shortly or immediately after the loop 29 engages the object 19. If the object is rather large, rotation of roller 2 is terminated sooner than when the loop 29 is to be applied around a relatively small object. In other words, the making of loops around large objects takes up less time than looping, tightening, severing and bonding of webs which are to be applied around relatively small objects. It is clear that the apparatus can be furnished with several differently configured and/or dimensioned loop forming devices 11 each of which is particularly suited for the making of loops around objects having a corresponding size and/or shape. This is desirable and advantageous when the apparatus is to apply loops around a series of identical objects.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. In an apparatus for applying webs around packages or other objects, the combination of a support; means for positioning an object on said support; a source of web; a device for looping the web around the object in said positioning means so that the looped section of the web includes overlapping inner and outer portions; means for bonding said overlapping portions to each other, including a bonding element movable toward and away from said outer portion along a first path; means for severing said outer portion from the source; and mobile holder means for moving said severing means along a second path to a first position in which said severing means is located in said first path and severs the outer portion along a cut located in a predetermined plane disposed within said first path and a second position in which said severing means is retracted from said first path so that said bonding element can move toward said outer portion while said cut remains in said first path to connect said outer portion with said inner portion all the way to said cut.

2. The combination of claim 1, wherein said bonding means includes means for generating ultrasonic waves and said bonding element includes an electrode connected with said generating means.

3. The combination of claim 1, wherein said holder means is pivotable with respect to said support about a fixed axis.

4. The combination of claim 1, further comprising an abutment mounted in said support adjacent to the inner portion of the looped web section, said severing means comprising clamping means arranged to engage a part of the looped web section and to bias said part against said abutment in a region which is adjacent to said cutting plane but is located outside of said first path in one position of said severing means.

5. The combination of claim 4, wherein said one position is said second position of said severing means.

6. The combination of claim 1, wherein said severing means comprises a casing and a cutting tool rotatably mounted in said casing, said casing and said tool having registering channels through which the web extends between said source and said outer portion of said looped portion, and further comprising means for rotating said cutting tool with respect to said casing in said first position of said severing means whereby the cutting tool severs the web in said plane.

7. The combination of claim 6, wherein said severing means is pivotable with respect to said support about a first axis and the axis of said tool is parallel to said first axis.

8. The combination of claim 6, wherein said tool and said casing comprise cooperating mobile and stationary cutting edges which sever the web in said plane in response to rotation of said tool in said first position of said severing means.

9. The combination of claim 6, wherein the channel of said tool has an inlet which registers with the channel of said casing in each angular position of said tool.

10. The combination of claim 1, wherein said loop forming device has a guide channel for said web and said guide channel has an open side, and further comprising means for moving said device with respect to said support between an operative position in which the looped section of the web is located in said guide channel and an inoperative position in which the looped section is exposed and loosely surrounds the object on said positioning means.

11. The combinations of claim 10, further comprising means for moving the web forwardly and backwards, said web being fed forwardly to form in said channel a loop and backwards upon movement of said device to said inoperative position so that the size of the loop diminishes until the latter snugly surrounds the object on said positioning means.

12. The combination of claim 10, wherein said support includes stop means for preventing movement of said loop forming device beyond said operative position.

13. The combination of claim 10, further comprising means for monitoring the web and for arresting said moving means during forward movement of the web when the foremost end of the web reaches a predetermined position with respect to said loop forming device upon completion of said loop.

14. The combination of claim 13, wherein said monitoring means comprises a proximity detector.

15. The combination of claim 10, further comprising means for monitoring the web during forward movement and for arresting said moving means upon withdrawal of a predetermined length of the web from said source.

16. The combination of claim 10, wherein said moving means comprises a web feeding device, a reversible prime mover for said web feeding device, and slip clutch means interposed between said prime mover and said feeding device.

17. The combination of claim 16, further comprising means for monitoring the movement of the web during backward movement thereof and for arresting said prime mover when the backward movement of the web is terminated as a result of snug engagement of the loop with the object in said positioning means.

* * * * *